US004001742B2

United States Statutory Invention Registration [19]

[11] Reg. Number: H1742

Richmond

[45] Published: Aug. 4, 1998

[54] GLINT RESPONSIVE PARAMETRIC AMPLIFIED PHASE CONJUGATE SIGNAL LASER RADAR

[75] Inventor: Richard D. Richmond, Springfield, Ohio

[73] Assignee: The United States of America as represented by the Secretary of the Air Force, Washington, D.C.

[21] Appl. No.: 34,775

[22] Filed: Mar. 2, 1998

[51] Int. Cl.[6] ..... G01C 3/02

[52] U.S. Cl. ..... 356/4.01; 356/3

*Primary Examiner*—Bernarr E. Gregory

*Attorney, Agent, or Firm*—Gerald B. Hollins; Thomas L. Kundert

[57] ABSTRACT

A laser radar system in which a laser beam is used to illuminate a target region of interest. The density of the laser radiation at the target plane is low enough that the reflected energy from diffusing portions of the target is not detectable by the laser radar receiver. Target reflections from retroreflective portions of the target such as glint signal reflections are also not initially detectable by the radar however these reflections are of such greater signal strength that the radar system is arranged to respond to the glint signals after they are enhanced by optical processing which includes re-illumination of the target glint area by a phase conjugated and parametrically amplified enhancement of the original reflected glint signal. Plural uses and alternate arrangements of the invention are included.

16 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GLINT RESPONSIVE PARAMETRIC AMPLIFIED PHASE CONJUGATE SIGNAL LASER RADAR

RIGHTS OF THE GOVERNMENT

The invention described herein may be manufactured and used by or for the Government of the United States for all governmental purposes without the payment of any royalty.

BACKGROUND OF THE INVENTION

This invention concerns glint-based high sensitivity target detection and ranging by optical energy signal transmission and optical signal processing, processing inclusive of non-linear optical effects such as parametric amplification and phase conjugation.

In the detection of distant targets through use of optical signals the combination of limited optical power availability from practical lasers and the relatively insensitivity of available signal detectors have combined to limit the practicality of optical radar systems such as the laser radar. In the present invention plural areas of improvement are combined to address this limitation and provide a laser radar system of increased sensitivity, simplicity and range.

The U.S. patent art indicates the presence of significant inventive activity in the area of optical signal processing including a number of inventions in which components employed in the present laser radar system are disposed in alternate applications. These components include parametric signal amplification, use of glint reflection based signals, phase conjugate signal reflection, retroreflection and three or four wave mixing including Stimulated Raman and Stimulated Brillouin signal amplification.

In particular the U.S. Pat. No. 4,005,935 of Victor Wang discloses an optical beam system in which laser produced glint reflections from a target are amplified and passed through a Brillouin mirror. A backscatter beam is then returned by the Brillouin mirror to the target along the path of the incident beam and the second reflection from the target further amplified and returned to the target. The Wang system also contemplates the achievement of phase compensation in the processed signals and tracking of target movements. The contents of the Wang U.S. Pat. No. 4,005,935 are hereby incorporated by reference herein.

Many additional of these prior patents are however understood to not disclose a laser radar system in which the combination of glint signal reflection, parametric amplification, phase conjugation, enhanced signal illumination with already processed glint signals and other aspects of the present invention are used.

SUMMARY OF THE INVENTION

The present invention provides for improved signal sensitivity in a laser radar apparatus through the use of combined optical signal processing techniques.

It is an object of the present invention therefore, to provide a laser radar apparatus of increased target sensitivity and effective operating range.

It is another object of the invention to provide a glint signal operated optical radar apparatus.

It is another object of the invention to provide for a laser radar apparatus in which phase conjugate processing of optical signals is used to an advantage.

It is another object of the invention to provide for a laser radar apparatus in which parametric amplification of optical signals is used to an advantage.

It is another object of the invention to provide for a laser radar apparatus in which the combination of parametric amplification and phase conjugate processing of optical glint signals are used to a sensitivity enhancing advantage.

It is another object of the invention to provide for a laser radar apparatus in which radar receiver based secondary illumination of a distal target glint signal source region is used for sensitivity enhancing advantage.

It is another object of the invention to provide for a laser radar apparatus in which secondary illumination of a target glint signal source region by glint signal sourced processed optical signals is used for sensitivity enhancement.

It is another object of the invention to provide for a laser radar apparatus in which reliable tactical target tracking signals can be generated in a relatively short time.

It is another object of the invention to provide for a laser radar apparatus capable of specifically enhancing target only signal returns.

It is another object of the invention to provide for a laser radar apparatus having both military and civilian use applications.

Additional objects and features of the invention will be understood from the following description and claims and the accompanying drawings.

These and other objects of the invention are achieved by the method of operating a highly directional laser radar system comprising the steps of:

- illuminating a distant target with laser based optical energy;
- communicating an optical signal return from both a signal diffusing area and a glint element of said distant target to an optical receiver apparatus;
- generating, in an optical amplifier of selected high threshold response, an amplified output signal representation of a glint element-determined input signal from said optical receiver apparatus, said generating step including forming, in said selected high threshold optical amplifier, input frequency and output frequency-related different frequency signals;
- forming from said amplified output signal a phase conjugated signal representative of said glint element signal;
- communicating said phase conjugated signal in opposed direction through said amplifier to form a reamplified phase conjugate signal;
- enhancing said optical signal return from said distant target by additionally illuminating said target with said reamplified phase conjugate signal;
- communicating a representation of said input signal as enhanced by said additional illumination to a using apparatus.

DETAILED DESCRIPTION

Figure 1:
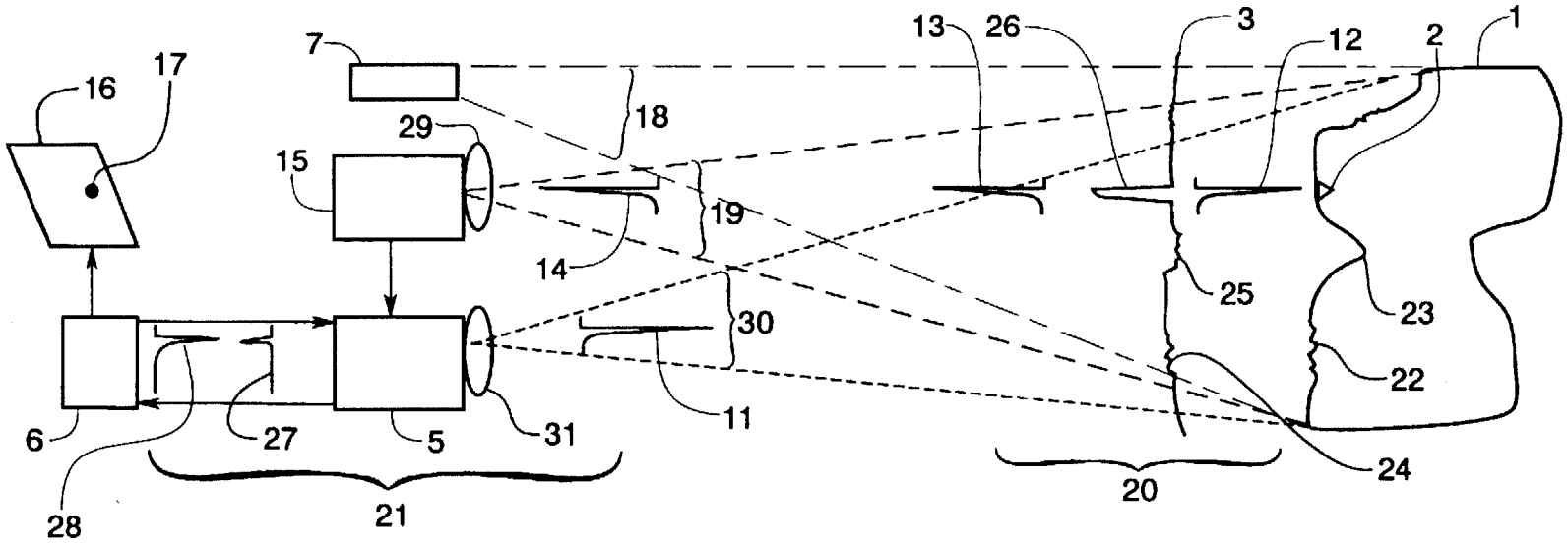
FIG. 1 shows a laser radar apparatus according to the present invention in functional block diagram form.

Previous attempts to use laser radar to detect tactical targets have had a limited rate of area coverage because of the limited power available from practical lasers and the relatively large energy required by practical detector sensitivities. Some previous systems for wide area coverage have in fact been little more than simple illuminators which include no attempt to specifically enhance target only returns or to provide target tracking capability.

As shown in FIG. 1 of the drawings the present invention however involves an enhanced use of a monochromatic laser beam to illuminate a tactical target-inclusive region of interest. According to the general concepts of this FIG. 1 arrangement the density of the laser radiation at the target plane is made low enough to assure the reflected energy from diffusing areas of the target is not initially detectable by the laser radar (ladar) receiver 15. Although many objects exhibit such diffusing optical properties, many man-made objects, as well as some natural objects also include surface portions which are highly reflective in the retro-direction, i.e. glint reflections. Such objects are described for example in the printed technical publications identified in a later portion of this specification.

Some especially large signal generating retro-reflections are therefore known as "glints". In the present invention a laser radar, a "ladar" is arranged such that such large signal glint retroreflections are not directly detectable by reason of the system sensitivity selected. However, the system is also arranged such that the increased response to a glint reflection is additionally processed to achieve an indirect or processed response to glint signals, a response that is detectable over system background signals. The processed signal can in fact include sufficient contrast or difference in signal strength between the glint signals and the background signals or noise that the system can be set to respond to the glint originating signals without false triggering on background level signals.

Concepts relevant to such a system can perhaps be better appreciated in general mathematical terms as follows. With a sensor looking at a wide target such as the ground, the power signal-to-noise (SNR) level of a ladar apparatus can be expressed by:

$$SNR=K\rho(\pi) \tag{1}$$

Where K is a constant term describing the system, and $\rho(\pi)$ is the reflectivity of the target per steradian and is a function of both the reflection profile ($\theta$) and the target albedo ($\alpha$). To evaluate the relative strength of the return from a glint signal in comparison with the background signal, the following ratio can be used:

$$\frac{SNR_{Target}}{SNR_{Background}}=\frac{\rho(\pi)_{Target}}{\rho(\pi)_{Background}} \tag{2}$$

Normal surfaces such as metal skins on vehicles have may have enhanced backscatter ratios of 10 or more[(1)]. For highly mirrored surfaces such as polished metal or windows, the reflection profile would be the same as the incident laser beam and albedos could approach a value of unity.

Comparing the signal for a fairly large incident beam of 5 degrees beamwidth against a Lambertian background (a surface that radiates into $\pi$ steradians) with an albedo of 0.2, the ratio of glint to background can be over 1500:1. Of course, the actual power returned also depends upon the actual area of the surface producing the glint signal , but it appears reasonable to expect that a system could be adjusted to detect such glints against a background.

In order to enhance the detectability of these glint signals, the present invention departs from the real of the simple illuminator and takes advantage of two nonlinear optical phenomena. The first phenomenon is optical parametric amplification. In this process, waves of frequency $\omega_3$ (the pump frequency) and $\omega_1$ (the signal frequency) mix to produce a wave at an idler frequency, $\omega_2$. The power of both the $\omega_1$ and $\omega_2$ waves increase with an accompanying increase in the power of the $\omega_3$ wave. This effect is called parametric amplification.

(Note Rich, be especially critical of the following three or four paragraphs to be sure my limited knowledge in the optical area has not led the application astray. The same is probably appropriate for claims 1 and 10, the independent claims of the application.)

The second nonlinear optical phenomenon applicable to the present invention is called phase conjugation. This name is derived from the fact that the accomplished effect involves phase reversal of an incoming electromagnetic wave. A brief description of the phase conjugate effect involves a complex monochromatic beam $E_1$ (e.g. a laser beam) propagating from point A to point B through some medium In the region of B, a wave $E_2$ is generated, by some means, whose complex amplitude over the area of the incident beam is the complex conjugate of that of $E_1$. Then $E_2$ will propagate backwards along the path of E, and intersect point A..

The present invention employs these phenomena in a manner which can perhaps be better appreciated by reference to the FIG. 1 drawing. In FIG. 1 a target object 1 is illuminated by output energy from an illuminating laser 7 propagating along a path 18. The laser energy is arranged to have a large field of view (FOV) and receiver optics 29 are arranged to also have a large FOV and to image the target plane onto that receiver FOV. Laser energy reflected from the target 1 travels back the location of the present invention apparatus along a second optical path indicated at 19 in the FIG. 1 drawing. Waveforms representing the general amplitude versus time characteristics of the optical energy in the region of the target 1, i.e. the electrical waveform output of a transducer which might receive this laser energy and convert it into electrical signal form, are represented at 20 in the FIG. 1 drawing. Similar waveforms representing optical energy signals as they appear at the location of the present invention apparatus are shown in the region 21 of FIG. 1. Notable aspects of these waveforms appear in the typical waveform at 3, a waveform representing laser energy initially reflected from the target 1. In this waveform 3, for example perturbations 22 and 23 along the surface of the target 1 appear as waveform aberrations at 24 and 25 respectively.

The FIG. 1 apparatus is arranged such that diffuse reflections, such as those from the perturbations 22 and 23, fall below the threshold of the imaging receiver 15, its internal amplifier and the parametric amplifier 5. However reflections from a glint region 2 of the target 1, reflections such as typically represented at 26 in the waveform 3 are above such a threshold; therefore any glints collected by the receiver 15 are amplified by the FIG. 1 apparatus by way of the nonlinear optical processing arrangements referred to generally above. A phase conjugator element in the FIG. 1 system is represented at 6 in the drawing and the signal received by this phase conjugator is represented at 27 in FIG. 1. The phase conjugator 6 may include a Brillouin mirror or other apparatus known in the optical art for use in such equipment. The phase conjugator 6 is mounted behind the parametric amplifier 5 so that the amplified glint signals as represented at 28 are reversed in phase polarity and send back to the target 1 glint area-passing again through the parametric amplifier 5 where a second level of amplification occurs.

This greatly increased and conjugated beam as represented by the larger glint signal pulse at 11 and the incident beam embodiment of this signal at 12 in FIG. 1 is caused to propagate back to the target 1 by way of the optics represented at 31 and the path 30 to reilluminate the target area of glint 2 that created the original glint pulse 26. This glint area reillumination is however at a higher intensity than that from the original search beam of the path 18 and the resulting higher reflection can be detected by a receiver detector, such as an Infra Red camera or a focal plane electro-optic detector array. Such an IR camera or a focal plane array and a display associated therewith are represented at 16 in the FIG. 1 drawing and the displayed glint image at 17. Signals operating the IR camera or a focal plane array and display may be obtained from an optical to electrical transducer included in the phase conjugator 6.

Another aspect of the present invention is that some of the conjugated, amplified energy that illuminates the glint area will again be reflected and return to the amplifier and the described process continually repeated. Because of the light propagation-related short time interval for the process to repeat, it is unlikely that any motion between the target and the sensor would move the target out of the narrow field of the returned beam. Therefore the FIG. 1 system also provides a practical means of autonomously tracking targets.

The FIG. 1 described amplification, retransmission, and secondary reflection of a glint return can significantly reduce the average power necessary for a laser radar to rapidly cover a region of interest. The system can also reduce the pointing accuracy and stability requirements for the optical components of the laser radar. The system also allows selective small sub-areas within the field of view to be automatically interrogated in finer detail without the need for complex computers to analyze the data and mechanically redirect the beam. The described system is inherently sensitive to highly directional reflections, therefore such reflections may, in the case of military uses of the system, be deliberately introduced by the use of retroreflectors in a target area. Such retroreflector devices could be dispersed for example at strategic points on airfields and thereby provide guidance feedback for later incoming airborne weapons. Alternatively the system may be used in autonomous landing systems such as might be used in unmanned aircraft operations.

Considering briefly possible modifications to the described FIG. 1 system the term parametric amplification is often associated in optics involving a class of interactions known as three wave mixing. However, for the present invention, the employed amplifier could make use of either such three wave mixing or a related class of phenomena known as four wave mixing. Examples of four wave mixing include Stimulated Raman devices and Stimulated Brillouin devices. Use of a four wave mixing phase conjugate mirror is for example described in the U.S. Pat. No. 5,535,049 of one Mark Bowers et al., a patent which is also hereby incorporated by reference herein. Although the relationship between the above described frequencies $\omega_3$, $\omega_1$ and $\omega_2$ may be different in each of these Stimulated Raman devices and Stimulated Brillouin devices cases, implementation of the present invention concept remains similar.

In addition although the term "glint" is usually associated with the highly directional reflections from surfaces such as mirrors, windows or polished metal the present invention is not necessarily limited to glint-originating signals. The concept of the invention may also take advantage of any phenomena which creates an increase in target return signal over the surrounding background signals. Examples of such phenomena include, but need not be limited to; enhanced reflectance due to sensitivity to a polarization of the incident laser radiation and enhanced reflectivity to specific narrow wavelengths of laser radiation.

In addition to the above identified U.S. patents the following publication references are believed to be of interest with respect to the concepts of the present invention. 1. Zu-Han Gu, Michel Josse, and Mikeal Ciftan, "Observation of giant enhanced backscattering of light from weakly rough dielectric films on reflecting metal substrates," Optical Engineering, Vol. 35 No. 2 February, 1996, (370–375). 2. H. Henshall and J. Cruickshank, "Reflectance characteristics of selected materials for reference targets for 10.6 μm laser radars," APPLIED OPTICS, Vol. 27, No. 13, 1 Jul., 1988, (2748–2755). 3. G. R. Osche, K. N. Seeber, Y. F. Lok, and D. S. Young, "Laser radar cross-section estimation from high resolution image data," APPLIED OPTICS, Vol. 31, No. 14, 10 May, 1992, (2452–2460).

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Glint responsive laser radar apparatus comprising the combination of:

a laser source of optical energy capable of illuminating a distal target;

optical energy image reception apparatus capable of detecting at least a glint signal return from said laser illuminated distal target;

optical signal amplification apparatus connected with a glint signal related output signal of frequency $\omega_1$ at an output port of said optical energy image reception apparatus and having a pump signal of frequency $\omega_3$, and an output signal path idler frequency of $\omega_2$;

optical phase conjugation apparatus connected with said $\omega_2$ idler frequency output signal path of said optical signal amplification apparatus and generating a backward propagating complex conjugate wave of said $\omega_2$ idler frequency along said $\omega_2$ signal path;

means for communicating said backward propagating complex conjugate wave of $\omega_2$ idler frequency back to said laser illuminated distal target in secondary reflection supplemental enhancement of said target illumination and said glint signal return therefrom;

an operator viewable optical receiver output display responsive to receipt of signals representing said glint signal from said optical phase conjugation apparatus.

2. The glint responsive laser radar apparatus of claim 1 wherein said optical energy image reception apparatus includes a detection threshold capable of discriminating between higher amplitude reflected optical signals including said glint signal and other lower amplitude signals received from said distal target.

3. The glint responsive laser radar apparatus of claim 1 wherein said optical signal amplification apparatus comprises one of a parametric amplification three wave mixing apparatus, a four wave mixing Stimulated Raman device and a four wave mixing Stimulated Brillouin device.

4. The glint responsive laser radar apparatus of claim 1 wherein said optical signal amplification apparatus comprises a parametric amplification three wave mixing apparatus.

5. The glint responsive laser radar apparatus of claim 1 wherein said operator viewable optical receiver output display also includes one of an Infra Red camera and a focal plane electro-optic detector array.

6. The glint responsive laser radar apparatus of claim 1 wherein said apparatus comprises a portion of an airborne weapons guidance apparatus.

7. The glint responsive laser radar apparatus of claim 1 wherein said apparatus comprises a portion of an unmanned aircraft landing operation apparatus.

8. The glint responsive laser radar apparatus of claim 1 wherein said optical energy image reception apparatus and said optical signal amplification apparatus include input and output optical lens apparatus respectively.

9. The glint responsive laser radar apparatus of claim 1 wherein said distal target comprises one of a man made object and a naturally existing object.

10. The method of operating a highly directional laser radar system comprising the steps of:

illuminating a distant target with laser based optical energy;

communicating an optical signal return from both a signal diffusing area and a glint element of said distant target to an optical receiver apparatus;

generating, in an optical amplifier of selected high threshold response, an amplified output signal representation of a glint element-determined input signal from said optical receiver apparatus, said generating step including forming, in said selected high threshold optical amplifier, input frequency and output frequency-related different frequency signals;

forming from said amplified output signal a phase conjugated signal representative of said glint element signal;

communicating said phase conjugated signal in opposed direction through said amplifier to form a reamplified phase conjugate signal;

enhancing said optical signal return from said distant target by additionally illuminating said target with said reamplified phase conjugate signal;

communicating a representation of said input signal as enhanced by said additional illumination to a using apparatus.

11. The method of operating a highly directional laser radar system of claim 10 wherein said laser based optical energy is monochromatic in nature.

12. The method of operating a highly directional laser radar system of claim 10 wherein said step of communicating a representation of said enhanced input signal includes one of the steps of communicating said signal to an operator by displaying a resulting signal on a viewable display and communicating said signal to one of an Infra Red camera and a focal plane electro-optic detector array.

13. The method of operating a highly directional laser radar system of claim 10 wherein said step of communicating a representation of said enhanced input signal includes each of the steps of communicating said signal to an operator by displaying a resulting signal on a viewable display and communicating said signal to an Infra Red camera and a focal plane electro optic detector array.

14. The method of operating a highly directional laser radar system of claim 10 wherein said step of forming an amplified output signal in an optical amplifier of selected high threshold response includes processing said amplified output signal in a parametric amplifier apparatus.

15. The method of operating a highly directional laser radar system of claim 10 wherein said step of forming an amplified output signal in an optical amplifier of selected high threshold response includes processing said amplified output signal in one of a four wave mixing Stimulated Raman amplifier and a four wave mixing Stimulated Brillouin amplifier.

16. The method of operating a highly directional laser radar system of claim 10 wherein said steps of generating, forming from said amplified output signal, communicating said phase conjugated signal, and enhancing by additionally illuminating are repeated in a continuing plurality of illumination-increasing iterations for each distant target object.

* * * * *